United States Patent
Ono et al.

(10) Patent No.: US 6,834,688 B2
(45) Date of Patent: Dec. 28, 2004

(54) FUEL GAS FILLING SYSTEM

(75) Inventors: Tohru Ono, Kawachi-gun (JP);
Masahiro Kawazu, Shioya-gun (JP);
Masami Ogura, Utsunomiya (JP);
Hiroyuki Abe, Utsunomiya (JP);
Kimiaki Yamada, Kawachi-gun (JP);
Ken Kumagai, Chiba (JP); Katsumi Saito, Shioya-gun (JP); Masanori Hayashi, Utsunomiya (JP); Masaru Shibasawa, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 12 days.

(21) Appl. No.: 10/696,143

(22) Filed: Oct. 29, 2003

(65) Prior Publication Data

US 2004/0094230 A1 May 20, 2004

(30) Foreign Application Priority Data

Oct. 29, 2002 (JP) ........................................ 2002-314146
Oct. 30, 2002 (JP) ........................................ 2002-316131

(51) Int. Cl.$^7$ ................................................ B65B 1/04

(52) U.S. Cl. .......................... 141/94; 141/94; 220/86.2; 220/DIG. 33; 296/97.22

(58) Field of Search .......................... 141/94, 346, 350; 220/86.2, DIG. 33; 296/97.22

(56) References Cited

U.S. PATENT DOCUMENTS 5,988,238 A * 11/1999 Palvolgyi ..................... 141/312
6,234,557 B1 * 5/2001 Bae .......................... 296/97.22

* cited by examiner

*Primary Examiner*—Steven O. Douglas
(74) *Attorney, Agent, or Firm*—Lahive & Cockfield, LLP; Anthony A. Laurentano

(57) ABSTRACT

A fuel gas filling system for a vehicle having a supply section and a fuel lid, which includes an opening operation section to which an opening operation for the fuel lid is applied, an operation wire, which is provided between the opening operation section and the fuel lid, for making the fuel lid respond to the opening operation applied to the opening operation section, and a locking device having a movable element, a fixed element, a lock pin, and an actuator. The actuator is adapted to make the lock pin to be engaged with the fixed element and the movable element when the vehicle is not in a stationary state.

9 Claims, 9 Drawing Sheets

FUEL GAS FILLING SYSTEM

BACKGROUND OF THE INVENTION

1. Field of the Invention

The present invention relates to a fuel filler lid opener, which restrains the opening operation of a fuel filler lid provided at a supply section, and relates to a fuel gas filling system, for a vehicle to which a fuel gas is supplied by connecting a fuel gas filler nozzle to the supply section.

Priority is claimed on Japanese Patent Application No. 2002-314146, filed Oct. 29, 2002, and Japanese Patent Application No. 2002-316131, filed Oct. 30, 2002, the contents of which are incorporated herein by reference.

2. Description of Related Art

In recent years, fuel cell vehicles and electrical vehicles have been developed for pratical use. As an example of such fuel cell vehicles, a type of vehicle is known in which driving power is generated through electrochemical reaction of a fuel gas, such as hydrogen, with an oxidizing gas, such as air. In such a vehicle, the fuel gas is stored in a fuel gas container installed in the vehicle. As an example of supplying a fuel gas into a fuel gas container, a process may be conceived which includes the steps of connecting a fuel gas filler nozzle, which is connected to an external fuel gas filling station, to a fuel gas filler receptacle (a supply section) provided in the vehicle, and supplying the fuel gas from the fuel gas filling station into the fuel gas container, as in the case for a vehicle fueled by natural gas. This process is similar to a process for charging a battery in the case of an electrical vehicle, which includes the steps of connecting an electrical energy supply connector of an external charging device to a charging terminal (a supply section) provided in the electrical vehicle, and supplying electrical energy from the external charging device to the battery.

In contrast to a fuel supply nozzle in the case of a gasoline vehicle, which is simply inserted to supply fuel, the supply section provided for supplying a fuel gas or electrical energy must firmly hold the fuel gas filler nozzle or the electrical energy supply connector so that the fuel gas filler nozzle or the electrical energy supply connector will not be easily disconnected. Accordingly, if the vehicle moves while the fuel gas filler nozzle or the electrical energy supply connector is connected, elements for connection may be broken. In order to avoid such problems, systems have been proposed in which an open or closed state of a fuel lid provided in a supply section is sensed and the vehicle is maintained stationary by holding the shift position in the vehicle when the fuel lid is open, and on the other hand, opening of the fuel lid is restrained when the vehicle is stationary (see, for example, Japanese Unexamined Patent Application, First Publication No. Hei 09-322313, Japanese Unexamined Patent Application, First Publication No. 2001-351667, and Japanese Unexamined Patent Application, First Publication No. Hei 09-086195)

Such a system is superior in view of preventing an erroneous movement of the vehicle during filling or charging; however, the system is complicated; therefore, a simpler system is desired.

In addition, when a fuel gas is to be supplied, static electrical charge must be dissipated before connecting the fuel gas filler nozzle to the fuel gas filler receptacle. To this end, a proposal has been made in which a ground connection portion is provided in the vehicle in addition to the fuel gas filler receptacle, and the ground connection portion is connected to a ground line of a fuel gas filling station for dissipating static electrical charge. In this case, the ground line of the fuel gas filling station must be connected to the ground connection portion provided in the vehicle before connecting the fuel gas filler nozzle to the fuel gas filler receptacle, and a system may be required in which the connection between the ground line and the ground connection portion of the vehicle is detected, and the connection of the fuel gas filler nozzle to the fuel gas filler receptacle is permitted only when the connection is detected.

SUMMARY OF THE INVENTION

In view of the above circumstances, an object of the present invention is to provide a fuel gas filling system, at a low cost, which retrains opening of a fuel lid when the vehicle is not stationary.

Another object of the present invention is to provide a fuel gas filling system for a gas-fueled vehicle, at a low cost, which maintains the gas-fueled vehicle in a stationary state when the filler lid thereof is open, and restrains opening of the filler lid when the gas-fueled vehicle is not stationary, and which also allows connection of a fuel gas filler nozzle to a fuel gas filler receptacle only after a grounding line of a fuel gas filling station is connected to the ground connection portion of the gas-fueled vehicle.

In order to achieve the above objects, the present invention provides a fuel gas filling system for a vehicle having a supply section which allows a fuel gas filler nozzle to be connected thereto, and a fuel lid which is operable to be opened or closed for covering the supply section, the fuel gas filling system including: an opening operation section to which an opening operation for the fuel lid is applied; an operation wire, which is provided between the opening operation section and the fuel lid, for making the fuel lid respond to the opening operation applied to the opening operation section; and a locking device having a movable element connected to the operation wire, a fixed element for supporting the movable element in a manner movable with the operation wire, a lock pin for restraining movement of the movable element by being inserted into the fixed element and the movable element, and an actuator for making the lock pin to be engaged with or disengaged from the fixed element and the movable element, wherein the actuator is adapted to make the lock pin to be engaged with the fixed element and the movable element when the vehicle is not stationary.

According to the above configuration, when the vehicle is not stationary, the lock pin is engaged with the fixed element and the movable element by the actuator in the locking device, and the movement of the movable element with respect to the fixed element is restrained, and thus the operation of the operation wire is restrained; therefore, the opening operation applied to the opening operation section is made ineffective, and the opening of the fuel lid is restrained, accordingly.

The present invention provides another fuel gas filling system for a vehicle having a fuel gas filler receptacle which allows a fuel gas filler nozzle to be connected thereto, a fuel lid which is operable to be opened or closed for covering the fuel gas filler receptacle, a ground connection section which allows a ground connection line to be connected thereto, and a ground connection lid which is operable to be opened or closed for covering the ground connection section, the fuel gas filling system including: an opening operation section which is provided in a portion that is covered by the ground connection lid in a closed state, and to which an opening operation for the fuel lid is applied; an operation wire, which is provided between the opening operation section and the fuel lid, for making the fuel lid respond to the opening operation applied to the opening operation section; and a locking device having a movable element connected to the operation wire, a fixed element for supporting the movable element in a manner movable with the operation wire, a lock pin for restraining movement of the movable element by being inserted into the fixed element and the movable element, and an actuator for making the lock pin to be engaged with or disengaged from the fixed element and the movable element, wherein the actuator is adapted to make the lock pin to be engaged with the fixed element and the movable element when the vehicle is not stationary.

According to the above configuration, because the opening operation section is provided in a portion that is covered by the ground connection lid in a closed state, the opening operation of the fuel lid can be applied to the operation section only after exposing the ground connection section, and thus the connection of the ground connection line to the ground connection section can be ensured.

In addition, when the vehicle is not stationary, the lock pin is engaged with the fixed element and the movable element by the actuator in the locking device, and the movement of the movable element with respect to the fixed element is restrained, and thus the operation of the operation wire is restrained; therefore, the opening operation applied to the opening operation section is made ineffective, and the opening of the fuel lid is restrained, accordingly.

The present invention further provides a fuel gas filling system for a gas-fueled vehicle having a fuel gas filler receptacle which allows a fuel gas filler nozzle to be connected thereto, a fuel filler lid which is operable to be opened or closed for covering the fuel gas filler receptacle, a ground connection section which allows a ground connection line to be connected thereto, and a ground connection lid which is operable to be opened or closed for covering the ground connection section, the fuel gas filling system comprising: a ground connection lid opening operation section to which an opening operation for the ground connection lid is applied; a fuel filler lid opening operation section which is provided in a portion that is covered by the ground connection lid in a closed state, and to which an opening operation for the fuel filler lid is applied; and an operating device for making the fuel filler lid respond to the opening operation applied to the fuel filler lid opening operation section; and a restraining device which is adapted to permit opening of the fuel filler lid by the opening operation applied to the fuel filler lid opening operation section when the gas-fueled vehicle is stationary, and to restrain opening of the fuel filler lid by the opening operation applied to the fuel filler lid opening operation section when the gas-fueled vehicle is not stationary.

According to the above configuration, because the fuel filler lid opening operation section is provided in a portion that is covered by the ground connection lid in a closed state, the opening operation of the ground connection lid must be applied to the ground connection lid opening operation section before applying the opening operation for the fuel filler lid; therefore, the connection of the ground connection line to the ground connection section can be ensured.

Moreover, when the gas-fueled vehicle is not stationary, the opening of the fuel filler lid through the opening operation applied to the fuel filler lid opening operation section is restrained by the restraining degrees. In addition, when the gas-fueled vehicle is stationary, the fuel filler lid can be opened, via the operating device, by applying an opening operation to the fuel filler lid opening operation section.

In the above fuel gas filling system, the operating device may include an operation wire provided between the fuel filler lid opening operation section and the fuel filler lid, and the restraining device may include a locking device which is adapted to make the operation of the operation wire to be possible or impossible, or to make the operation of the operation wire to be effective or ineffective.

According to the above configuration, when the gas-fueled vehicle is not stationary, the operation of the operation wire is made impossible or ineffective by the locking device; therefore, the opening of the fuel filler lid can be mechanically restrained even if an opening operation is applied to the fuel filler lid opening operation section. On the other hand, when the gas-fueled vehicle is stationary, the operation of the operation wire is made possible or effective; therefore, the fuel filler lid can be opened through the opening operation applied to the fuel filler lid opening operation section.

Alternatively, the operating device may include a switching section which allows electricity to flow through when the opening operation is applied to the fuel filler lid opening operation section, and a coil section which allows the fuel filler lid to be opened by being supplied with excitation electricity when electricity flows through the switching section, and the restraining device may include a relay circuit which is adapted to make the switching section and the coil section to be connected to or disconnected from each other.

According to the above configuration, when the gas-fueled vehicle is not stationary, the switching section is disconnected from the coil section by the relay circuit; therefore, the excitation electricity is not applied to the coil section, and thus the opening of the fuel filler lid can be electricity restrained even if an opening operation is applied to the fuel filler lid opening operation section. On the other hand, when the gas-fueled vehicle is stationary, the switching section is connected to the coil section by the relay circuit; therefore, the excitation electricity is applied to the coil section through the opening operation applied to the fuel filler lid opening operation section, and the fuel filler lid can be opened.

The fuel gas filling system may further include an opening sensor for sensing whether the fuel filler lid is open or closed, and the gas-fueled vehicle may be maintained stationary when it is determined by the opening sensor that the fuel filler lid is open.

According to the above configuration, when it is determined that the fuel filler lid is open, the gas-fueled vehicle is maintained stationary; therefore, the gas-fueled vehicle can be reliably prevented from moving during a filling operation of the fuel gas.

The fuel gas filling system may further include an opening sensor for sensing whether the fuel filler lid is open or closed, and, when it is determined by the opening sensor that the fuel filler lid is open, the gas-fueled vehicle may be maintained stationary, and the excitation electricity may not be supplied to the coil section.

According to the above configuration, when it is determined that the fuel filler lid is open, the gas-fueled vehicle is maintained stationary; therefore, the gas-fueled vehicle can be reliably prevented from moving during a filling operation of the fuel gas.

In addition, when it is determined that the fuel filler lid is open, the excitation electricity will not be supplied to the coil section; therefore, the excitation electricity will not continuously flow through the coil section.

DETAILED DESCRIPTION OF THE INVENTION

A first embodiment of the present invention, i.e., a fuel cell powered vehicle (hereinafter referred to as a fuel cell vehicle) as an example, will be explained below with reference to FIGS. 1 to 6.

Figure 1:
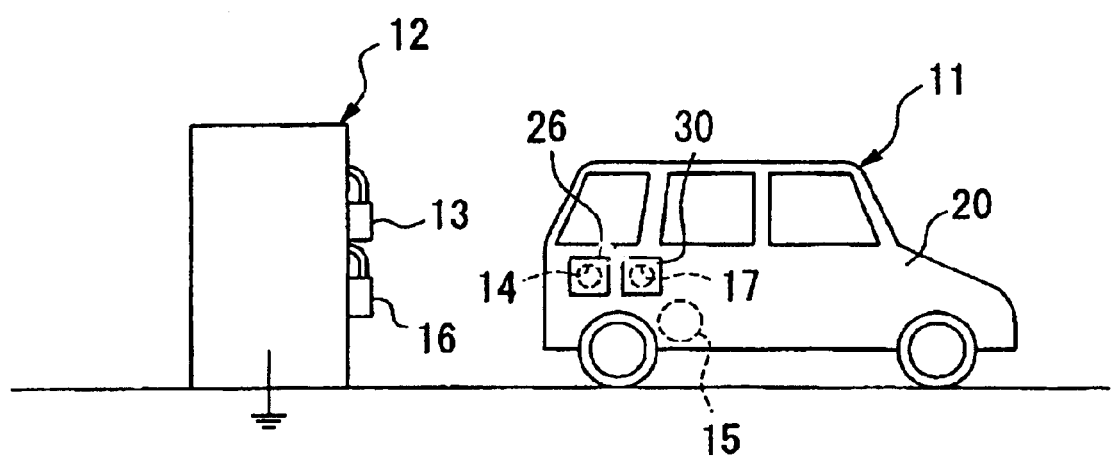
FIG. 1 is a side view showing a fuel cell powered vehicle and a fuel gas filling station in a first embodiment of the present invention.

As shown in FIG. 1, a fuel cell vehicle 11 includes a fuel gas filler receptacle 14 (a supply section) to which a fuel gas filler nozzle 13 of an external fuel gas filling station 12, which is provided separately from the fuel cell vehicle 11, is to be connected, and to which a fuel gas (e.g., hydrogen) is supplied from the fuel gas filling station 12 via the connected fuel gas filler nozzle 13, a fuel gas tank 15 which stores the fuel gas supplied from the fuel gas filling station 12 via the fuel gas filler receptacle 14, and a ground connection section 17 to which a ground connection line 16 of the fuel gas filling station 12 is connected, and which is provided for dissipating static electrical charge via the connected ground connection line 16. The fuel gas filler receptacle 14 and the ground connection section 17, which are disposed adjacent to each other, are provided at a rear and lateral portion of a vehicle body 20. In addition, a fuel filler lid 26 is provided in the vehicle body 20 where the fuel gas filler receptacle 14 is disposed, and a ground connection lid 30 is provided in the vehicle body 20 where the ground connection section 17 is disposed.

Figure 2:
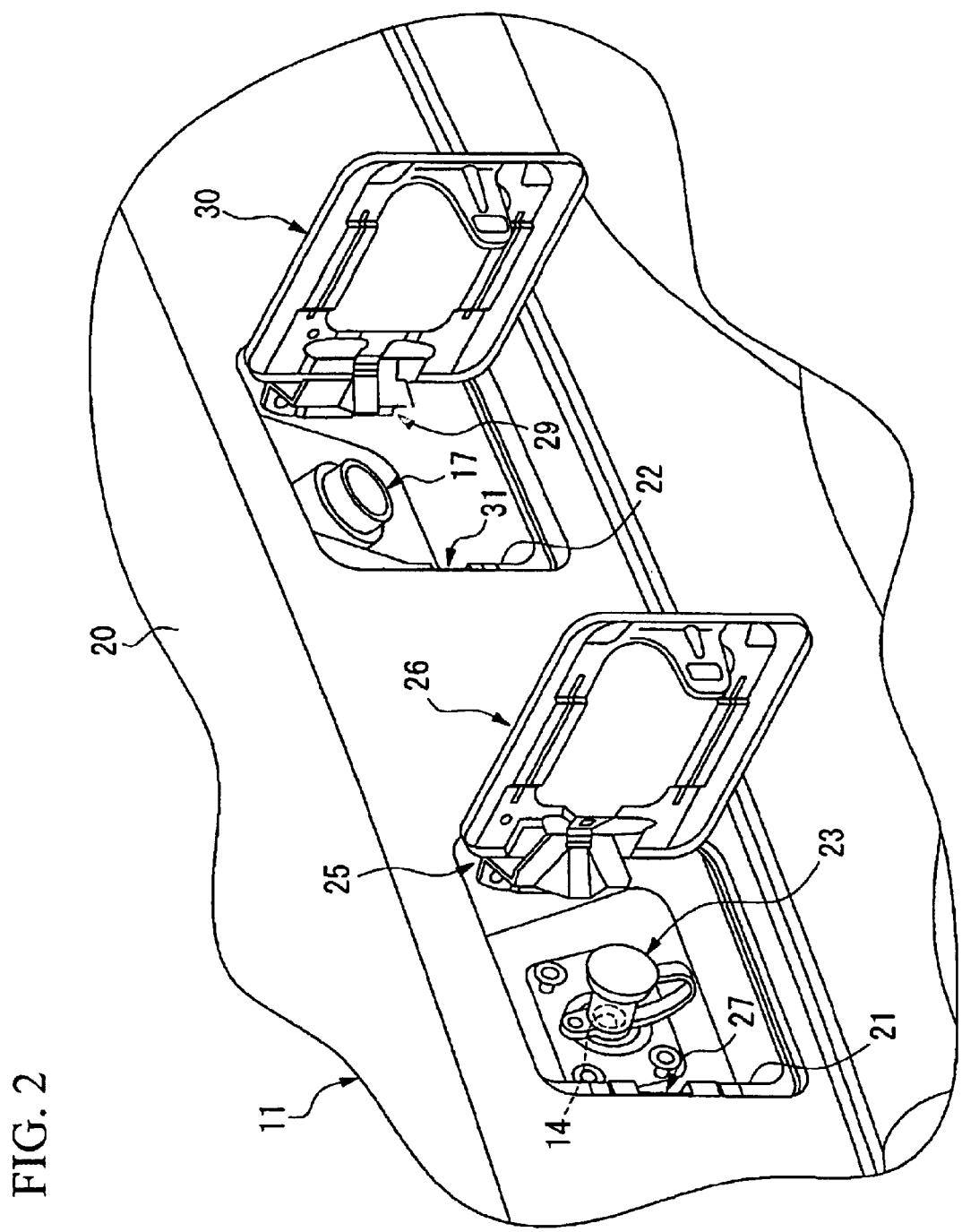
FIG. 2 is a perspective view showing a fuel gas filler receptacle and a ground connection section.

As shown in FIG. 2, the fuel gas filler receptacle 14 is provided in the back of a fuel filler concave portion 21 formed in the vehicle body 20. The fuel filler concave portion 21 is provided with a fuel filler lid 26 which is swingable, by being connected to the vehicle body 20 using a hinge mechanism 25, between a closed state in which the fuel filler concave portion 21 is closed and an opened state in which the fuel filler concave portion 21 is opened, and is also provided with a fuel filler lid locking mechanism 27 for locking the fuel filler lid 26 in the closed state with respect to the vehicle body 20. When the fuel filler lid 26 is in the closed state, the fuel gas filler receptacle 14 is not accessible from outside because the fuel gas filler receptacle 14 is covered by the fuel filler lid 26 along with a cap 23. On the other hand, when the fuel filler lid 26 is in the opened state, the fuel gas filler receptacle 14 is exposed and is accessible from outside.

The ground connection section 17 is provided in the back of a ground connection concave portion 22 formed in the vehicle body 20. The ground connection concave portion 22 is provided with a ground connection lid 30 which is swingable, by being connected to the vehicle body 20 using a hinge mechanism 29, between a closed state in which the ground connection concave portion 22 is closed and an opened state in which the ground connection concave portion 22 is opened, and is also provided with a ground connection lid locking mechanism 31 for locking the ground connection lid 30 in the closed state with respect to the vehicle body 20. When the ground connection lid 30 is in the closed state, the ground connection portion 17 is not accessible from outside because the ground connection portion 17 is covered by the ground connection lid 30. On the other hand, when the ground connection lid 30 is in the opened state, the ground connection portion 17 is exposed and is accessible from outside.

Figure 3:
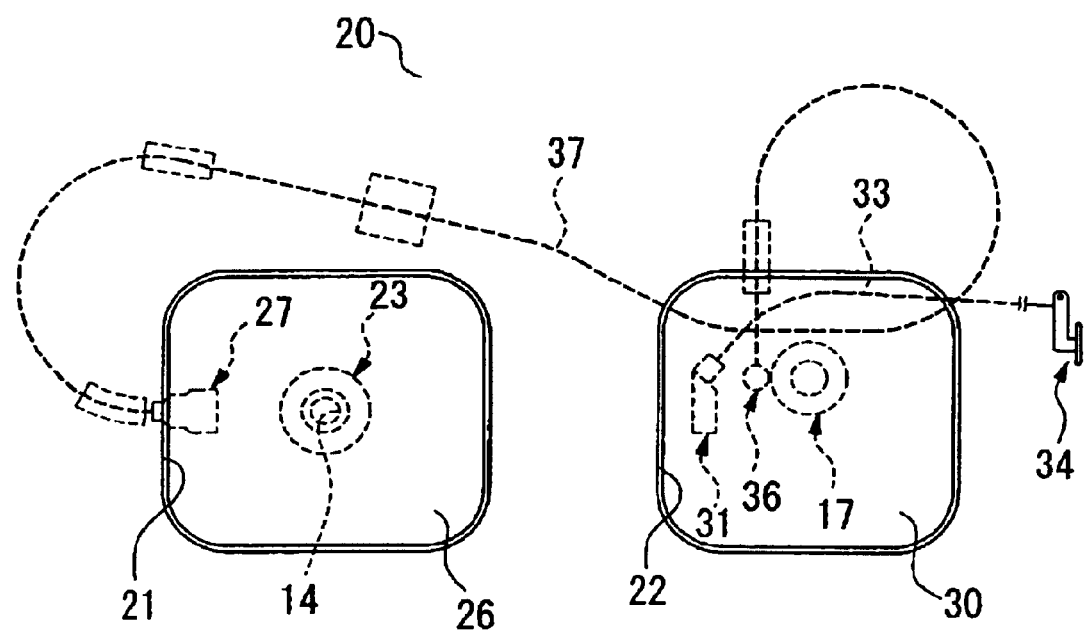
FIG. 3 is a side view showing a portion of the vehicle in the vicinity of the fuel gas filler receptacle and the ground connection section.

As shown in FIG. 3, an unlocking wire 33 is connected to the ground connection lid locking mechanism 31. The unlocking wire 33 is connected to a ground connection lid opener 34 which is disposed in the cabin of the vehicle. When an operator (a driver) manually operates the ground connection lid opener 34, e.g., pulls the ground connection lid opener 34, in a state in which the ground connection lid locking mechanism 31 locks the ground connection lid 30 in a closed state, the ground connection lid 30 is unlocked by the movement of the unlocking wire 33, and then the ground connection lid 30 is opened. On the other hand, when the ground connection lid 30 in the opened state is swung by a filling operator so as to close the ground connection lid 30, the ground connection lid 30 is automatically locked by the ground connection lid locking mechanism 31.

Moreover, a fuel filler lid opener 36 (an opening operation section), which is operated by a filling operator in order to open the fuel filler lid 26, is disposed in the ground connection concave portion 22 along with the ground connection portion 17 so as to be adjacent to each other. An unlocking cable 37 (a operation wire) is connected to the fuel filler lid opener 36, and the unlocking cable 37 is connected to the fuel filler lid locking mechanism 27 at the other end thereof. When an operator manually operates the fuel filler lid opener 36, e.g., pulls the fuel filler lid opener 36, in a state in which the fuel filler lid locking mechanism 27 locks the fuel filler lid 26 in a closed state, the fuel filler lid 26 is unlocked by the movement of the unlocking cable 37, and then the fuel filler lid 26 is opened. On the other hand, when the fuel filler lid 26 in the opened state is swung by a filling operator so as to close the fuel filler lid 26, the fuel filler lid 26 is automatically locked by the fuel filler lid locking mechanism 27.

As explained above, the fuel filler lid opener 36, which is operated by a filling operator in order to open the fuel filler lid 26, is disposed in the ground connection concave portion 22 in the vehicle body 20 in such a manner that the fuel filler lid opener 36 is covered by the ground connection lid 30, i.e., the fuel filler lid opener 36 is not exposed, when the ground connection lid 30 is closed, and that the fuel filler lid opener 36 is exposed when the ground connection lid 30 is opened.

In addition, a fuel gas filling system is provided in the fuel cell vehicle 11, which restrains filling of the fuel gas when the shift position of the automatic transmission provided in the fuel cell vehicle 11 is in a shift position other than Park (P position), i.e., when the fuel cell vehicle 11 is not stationary, and which maintains the shift position in the parking position, i.e., maintains the fuel cell vehicle 11 in a stationary state during the filling operation of the fuel gas.

Figure 4:
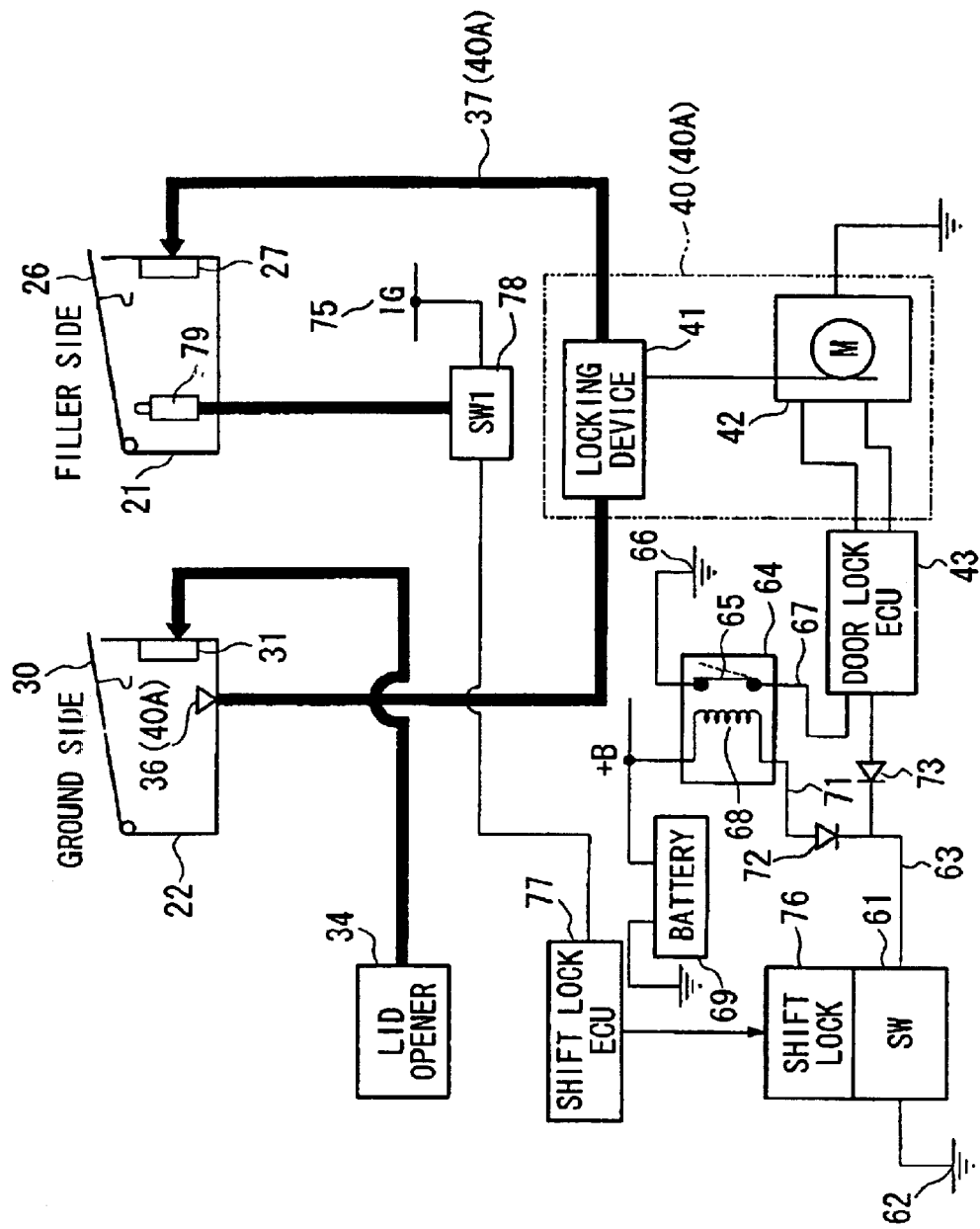
FIG. 4 is a block diagram showing a fuel gas filling system according to the first embodiment.

As shown in FIG. 4, the fuel gas filling system includes a cable locking device 40 (a locking device) which is capable of fixing and releasing the unlocking cable 37. The cable locking device 40 includes a locking section 41 provided in the unlocking cable 37, and an actuator 42 for operating the locking section 41. The actuator 42 is made selectively operable by a door lock ECU 43. The cable locking device 40, the fuel filler lid opener 36, and the unlocking cable 37 together form a fuel filler lid opening device 40A.

Figure 5:
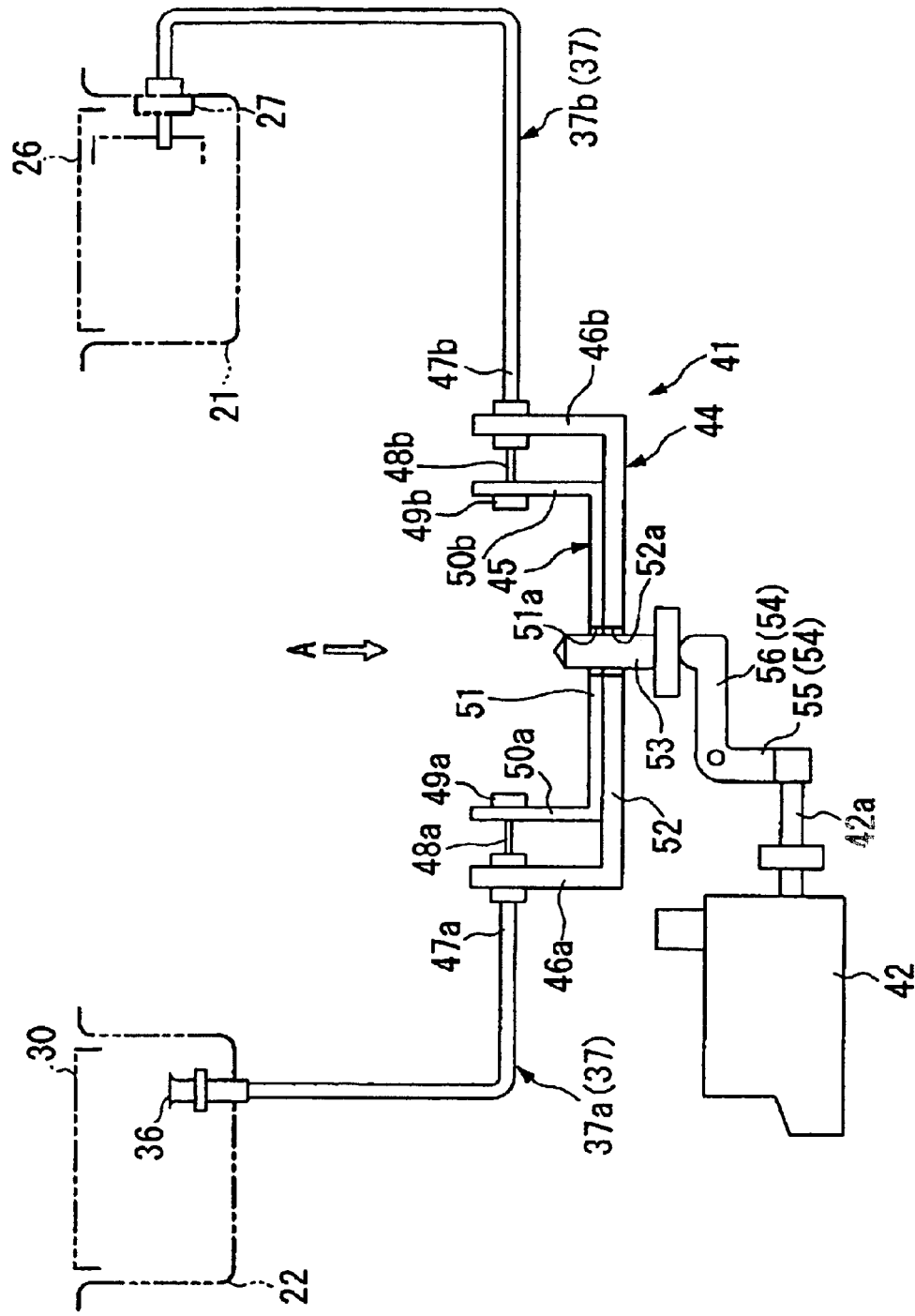
FIG. 5 is a side view showing a fuel filler lid opener.
Figure 6:
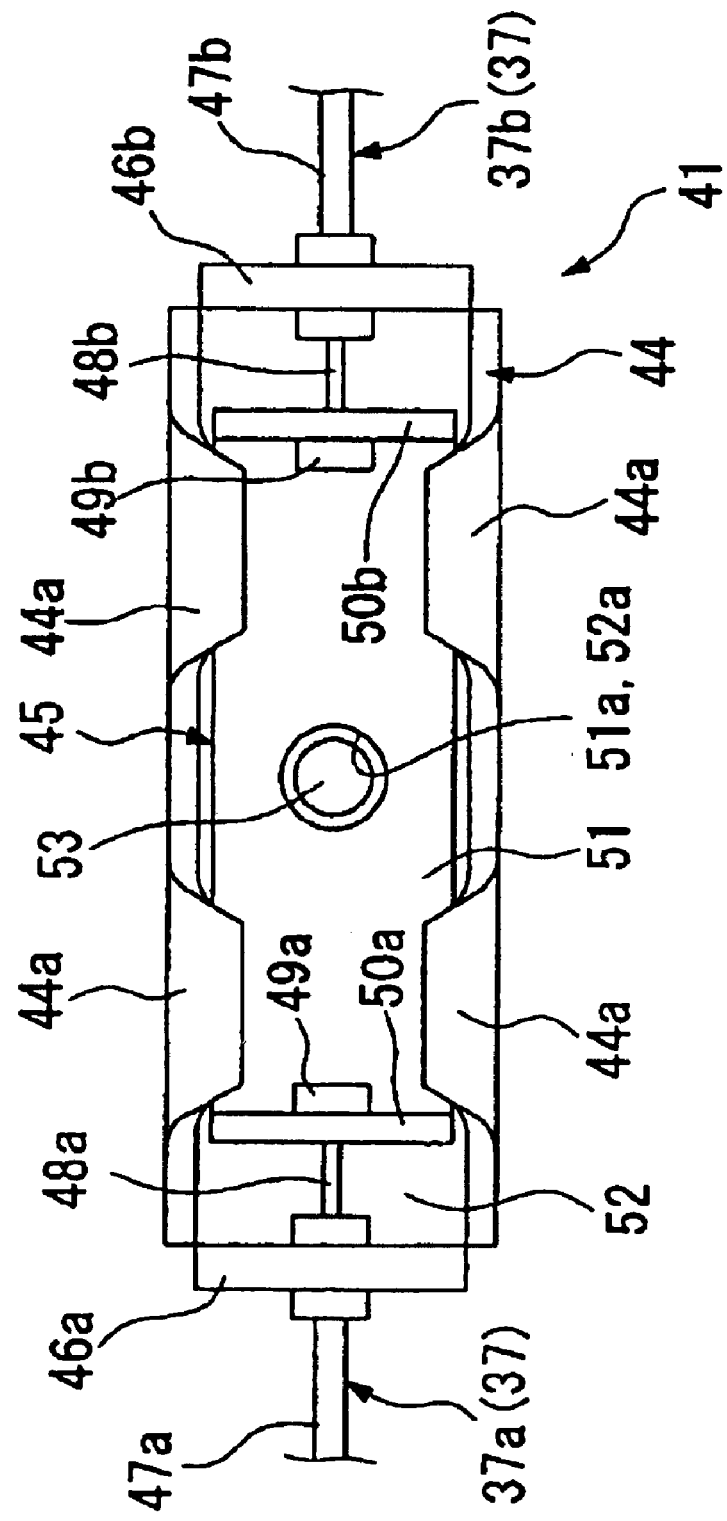
FIG. 6 is a plan view showing the fuel filler lid opener as viewed along the arrow "A" in FIG. 5.

The fuel filler lid opening device 40A will be explained below with reference to FIGS. 5 and 6.

The unlocking cable 37 is divided into two portions, one is a cable 37a which is connected to the fuel filler lid opener 36, and the other is a cable 37b which is connected to the fuel filler lid locking mechanism 27. The locking section 41 is disposed between the cables 37a and 37b. The locking section 41 includes a fixed element 44 and a movable element 45. The fixed element 44 is formed like a box having a rectangular parallelepiped shape elongating along the cables 37a and 37b while having an opening in an upper side. The movable element 45 is made movable with respect to the fixed element 44 in the longitudinal direction of the fixed element 44. Flanges 44a (shown in FIG. 5) are provided in the upper opening of the fixed element 44 in order to support the movable element 45.

To walls 46a and 46b of the fixed element 44, which are arranged in the longitudinal direction of the fixed element 44, outer cables 47a and 47b of the cables 37a and 37b are connected, respectively. Inner cables 48a and 48b of the cables 37a and 37b respectively pass through the walls 46a and 46b, and engagement portions 49a and 49b respectively provided at the ends of the inner cables 48a and 48b are respectively engaged with walls 50a and 50b which are arranged in the longitudinal direction of the movable element 45. When an opening operation is applied to the fuel filler lid opener 36, the inner cable 48a of the cable 37a is pulled so that the movable element 45 moves with respect to the fixed element 44, and the inner cable 48b of the cable 37b is pulled by the movable element 45 so that the fuel filler lid locking mechanism 27 is released from a locked state. Even though it is not shown, the fuel filler lid opener 36 and the fuel filler lid locking mechanism 27 are respectively provided with biasing elements; therefore, after completion of the opening operation, the fuel filler lid opener 36 and the fuel filler lid locking mechanism 27 will return to the states before the opening operation was performed.

The movable element 45 includes a bottom plate 51, and the fixed element 44 includes a bottom plate 52. The underside of the bottom plate 51 abuts against the upper surface of the bottom plate 52 so to enable a relative movement between the movable element 45 and the fixed element 44. In the bottom plate 51 of the movable element 45 and the bottom plate 52 of the fixed element 44, there are formed through holes 51a and 52a, respectively, which are arranged so as to overlap each other when the fuel filler lid locking mechanism 27 is in the locked state. Moreover, a lock pin 53 is provided so as to penetrate the through holes 51a and 52a when the fuel filler lid locking mechanism 27 is in the locked state. The lock pin 53 is associated with the actuator 42 via a link 54 which is pivotably supported by the vehicle body 20. When the actuator 42 is operated so that an operation portion 42a of the actuator 42 projects to push a trigger portion 55 of the link 54, the link 54 pivots to push the lock pin 53 at a pushing portion 56 thereof, and the lock pin 53 is inserted into the through holes 51a and 52a, and thus the movement of the movable element 45 with respect to the fixed element 44 is mechanically restrained.

In other words, the outer cables 47a and 47b connected to the fixed element 44 are mechanically fixed to the inner cables 48a and 48b, respectively, so that the opening operation using the fuel filler lid opener 36 is made impossible. On the other hand, when the operation portion 42a of the actuator 42 returns to a position before projecting, the lock pin 53 comes out of the through holes 51a and 52a due to the weight thereof or due to a biasing force generated by a biasing element (not shown), and the movable element 45 is again made movable with respect to the fixed element 44.

As shown in FIG. 4, a ground connection line 63, which is connected to a ground point 62 via a shift position switch 61 that finds the current shift position in the fuel cell vehicle 11, and a ground connection line 67, which is connected to a ground point 66 via a relay switch 65 of a closing relay 64, are connected to the door lock ECU 43. The door lock ECU 43 is grounded at the ground point 62 or 66 depending on whether the shift position switch 61 and the relay switch 65 are in the ON state or in the OFF state. When the door lock ECU 43 is grounded at the ground point 62, the door lock ECU 43 controls the actuator 42 so that the operation portion 42a of the actuator 42 of the cable locking device 40 is projected, and when the door lock ECU 43 is grounded at the ground point 66, the door lock ECU 43 controls the actuator 42 so that the operation portion 42a of the actuator 42 of the cable locking device 40 is not projected.

The shift position switch 61 is in the OFF state, i.e., the contact points thereof are open, when the shift position in the fuel cell vehicle 11 is in the P position, and the shift position switch 61 is in the ON state, i.e., the contact points thereof are closed, when the shift position in the fuel cell vehicle 11 is in a position other than the P position (R, N, or D position).

A positive voltage due to a battery 69 is applied to a relay coil 68 of the closing relay 64, and a ground connection line 71 of the relay coil 68 is connected to the ground connection line 63 via a diode 72 for preventing reverse current. When the shift position switch 61 is in the OFF state, because excitation current does not flow through the relay coil 68, the relay switch 65 is placed in the ON state, i.e., the contact points thereof are closed. On the other hand, when the shift position switch 61 is in the ON state, because the relay coil 68 is excited, the relay switch 65 is placed in the OFF state, i.e., the contact points thereof are open. Another diode 73 for preventing reverse current is connected between the intersection of ground connection lines 63 and 71 and the door lock ECU 43.

Accordingly, when the shift position in the fuel cell vehicle 11 is in the P position, the door lock ECU 43 is connected to the ground point 66, and the operation portion 42a of the actuator 42 of the cable locking device 40 is not projected. On the other hand, when the shift position is in a position other than the P position, the door lock ECU 43 is connected to the ground point 62, and the operation portion 42a of the actuator 42 of the cable locking device 40 is projected.

A shift lock device 76, which is operatively connected to an ignition 75 of the fuel cell vehicle 11 and is provided for fixing the shift position in the P position, is controlled by a shift lock ECU 77. The shift lock ECU 77 is connected to the ignition 75 via a fuel filler lid opening switch 78. The fuel filler lid opening switch 78 is operatively connected to an opening sensor 79 which is provided in the fuel filler concave portion 21, and which determines whether the fuel filler lid 26 is open or closed. When it is determined by the opening sensor 79 that the fuel filler lid 26 is open, the fuel filler lid opening switch 78 is placed in the OFF state, i.e., the contact points thereof are open, and when it is determined by the opening sensor 79 that the fuel filler lid 26 is closed, the fuel filler lid opening switch 78 is placed in the ON state, i.e., the contact points thereof are closed.

When it is determined by the fuel filler lid opening switch 78 that the shift lock ECU 77 is disconnected from the ignition 75, the shift lock ECU 77 determines that the fuel gas is being filled, and operates the shift lock device 76 so as to fix the shift position in the P position regardless of the state of the ignition 75.

Next, the operation of this system will be explained below.

In order to supply the fuel gas to the fuel cell vehicle 11, the fuel cell vehicle 11 is completely stopped, and the shift position is placed in the P position so as to place the fuel cell vehicle 11 in a parked state. After that, when the ground connection lid opener 34 is manually operated so as to open, for example, by the driver, the ground connection lid 30, which has been locked by the ground connection lid locking mechanism 31, is unlocked by the movement of the unlocking wire 33, and the ground connection lid 30 is opened. Next, a filling operator connects the ground connection line 16 of the fuel gas filling station 12 to the ground connection section 17 which is exposed by opening the ground connection lid 30. At this time, the static electrical charge which has accumulated in the vehicle body 20 of the fuel cell vehicle 11 and in the filling operator is dissipated through the ground connection line 16, and as a result, potential differences among the vehicle body 20 of the fuel cell vehicle 11, the filling operator, and the fuel gas filling station 12 become zero.

Because the fuel filler lid opener 36 of the fuel filler lid opening device 40A, which is provided in the ground connection concave portion 22, is not exposed as long as the ground connection lid 30 is closed, the fuel filler lid 26 cannot be opened, and the fuel gas filler receptacle 14 will not be exposed as long as the ground connection lid 30 is closed; therefore, an erroneous operation, in which the fuel filler lid 26 is open, and the fuel gas filler nozzle 13 of the external fuel gas filling station 12 is connected to the fuel gas filler receptacle 14 before connecting the ground line 16 to the ground connection portion 17, can be prevented.

Next, when the fuel filler lid opener 36 of the fuel filler lid opening device 40A, which is exposed by opening the ground connection lid 30, is manually operated by the filling operator, the fuel filler lid 26, which has been locked by the fuel filler lid locking mechanism 27, is unlocked by the operations of the unlocking cable 37 and the locking section 41, and the fuel filler lid 26 is opened.

The operation portion 42a of the actuator 42 of the cable locking device 40 will not be projected only when the fuel cell vehicle 11 is placed in the parked state, and the lock pin 53 is separated from the fixed element 44 and the movable element 45; therefore, the movable element 45 is made movable with respect to the fixed element 44. Accordingly, the unlocking cable 37 is operatable, an opening operation by the fuel filler lid opener 36 is possible, and the fuel gas can be supplied through the fuel gas filler receptacle 14 after opening the fuel filler lid 26. On the other hand, when the fuel cell vehicle II is not placed in a parked state, the operation portion 42a of the actuator 42 is projected, and the lock pin 53 is inserted into the fixed element 44 and the movable element 45 so that relative movement between the fixed element 44 and the movable element 45 is restrained. Accordingly, the outer cable 47 and the inner cable 48 of the unlocking cable 37 are mechanically fixed to each other, and an opening operation by the fuel filler lid opener 36 is reliably restrained. The fuel gas cannot be supplied because the fuel filler lid 26 is maintained to be closed, and the fuel gas filler receptacle 14 is not accessible.

Then, the filling operator removes the cap 23 of the fuel gas filler receptacle 14, which is exposed by opening the fuel filler lid 26, and connects the fuel gas filler nozzle 13 of the external fuel gas filling station 12 to the fuel gas filler receptacle 14 to supply the fuel gas to the vehicle.

When the fuel filler lid 26 is opened, the shift position is placed in the P position; therefore, an unintended movement of the fuel cell vehicle 11 from the parked location during the filling operation of the fuel gas can be reliably prevented.

When it is determined by the opening sensor 79 that the fuel filler lid 26 is open, the fuel filler lid opening switch 78 is placed in the OFF state so that the shift lock ECU 77 is disconnected from the ignition 75; therefore, the shift lock device 76 operates regardless of the state of the ignition 75. Accordingly, even when a driver tries to start the fuel cell vehicle 11 without knowing that the fuel cell vehicle 11 is in the filling operation, the shift position cannot be changed from the P position, and thus an erroneous movement of the fuel cell vehicle 11 can be reliably prevented.

After supplying the fuel gas, the filling operator removes the fuel gas filler nozzle 13 from the fuel gas filler receptacle 14, engages the cap 23 with the fuel gas filler receptacle 14, disconnects the ground connection line 16 of the fuel gas filling station 12 from the ground connection section 17, and closes the fuel filler lid 26 and ground connection lid 30. As a result, the state returns to the state before the filling operation, in which the fuel filler lid 26 is locked in the closed state by the fuel filler lid locking mechanism 27, and the ground connection lid 30 is locked in the closed state by the ground connection lid locking mechanism 31.

When it is determined by the opening sensor 79 that the fuel filler lid 26 is closed, the fuel filler lid opening switch 78 is placed in the ON state so that the shift lock ECU 77 is connected to the ignition 75; therefore, the shift lock device 76 operates in accordance with the ignition 75. When the ignition 75 is placed in the ON state in this state, the shift lock device 76 is canceled as usual, and the shift position can be changed to the D position or the like so that the fuel cell vehicle 11 can be driven.

According to the fuel filler lid opening device 40A of the above embodiment, the unlocking cable 37 can be made operatable by making the operation portion 42a of the actuator 42 of the cable locking device 40 not to be projected so that the lock pin 53 is separated from the fixed element 44 and the movable element 45, and the fuel filler lid opener 36 can be opened, and thus the fuel gas can be supplied to the fuel cell vehicle 11. On the other hand, the unlocking cable 37 can be mechanically fixed by making the operation portion 42a of the actuator 42 of the cable locking device 40 to be projected so that the lock pin 53 is inserted into the fixed element 44 and the movable element 45, and opening of the fuel filler lid opener 36 can be restrained, and thus the filling operation of the fuel gas can also be restrained. As explained above, the filling operation of the fuel gas can be reliably restrained as necessary by simply configuring the lock pin 53 to be engaged with or disengaged from the fixed element 44 and the movable element 45.

When the ground connection lid 30 is in the closed state, because the fuel filler lid opener 36 of the fuel filler lid opening device 40A is covered by the ground connection lid 30 and is not exposed, an opening operation cannot be applied to the fuel filler lid opener 36. On the other hand, when the ground connection lid 30 is opened, both the fuel filler lid opener 36 and the ground connection section 17 are exposed so that the fuel filler lid 26 can be opened, and the ground connection line 16 of the fuel gas filling station 12 can be connected the ground connection section 17. The connection of the fuel gas filler nozzle 13 to the fuel gas filler receptacle 14 can be accomplished only after the ground connection line 16 is connected to the ground connection section 17 by merely disposing the fuel filler lid opener 36 of the fuel filler lid opening device 40A in a region which is covered by the ground connection lid 30 in a closed state.

In addition, because the fuel filler lid opener 36 is connected to the fuel filler lid locking mechanism 27 using the unlocking cable 37, and the cable locking device 40, which operates mechanically, is employed, the overall configuration can be made simpler when compared with the case in which the fuel filler lid opener 36 is electrically connected to the fuel filler lid locking mechanism 27, and moreover, a well-known cable lock mechanism, which is used for a trunk lid in a conventional vehicle, may be employed. Accordingly, a fuel gas filling system can be provided at a low cost, which places the vehicle in a stationary state when the fuel filler lid 26 is open, and which restrains opening of the fuel filler lid 26 when the vehicle is not in a stationary scale.

The present invention is not limited to the above embodiment. For example, the fuel filler lid opening device 40A may be applied to a vehicle which does not include the ground connection lid 30 and includes only the fuel filler lid 26.

In the above embodiment, whether the vehicle is in a stationary state is determined by determining whether the shift position in the automatic transmission is in the P position; however, in the case of a manual transmission, for example, whether the vehicle is in a stationary state may be determined by determining whether the handbrake of the vehicle is effectively operated, or by determining whether the ignition of the vehicle is in the ON state or OFF state.

The fuel gas filling system of the present invention may also be applicable to an electrical vehicle or a natural gas-fueled vehicle.

A second embodiment of the present invention, i.e., a fuel cell vehicle as an example, will be explained below with reference to FIGS. 7 to 9.

Figure 7:
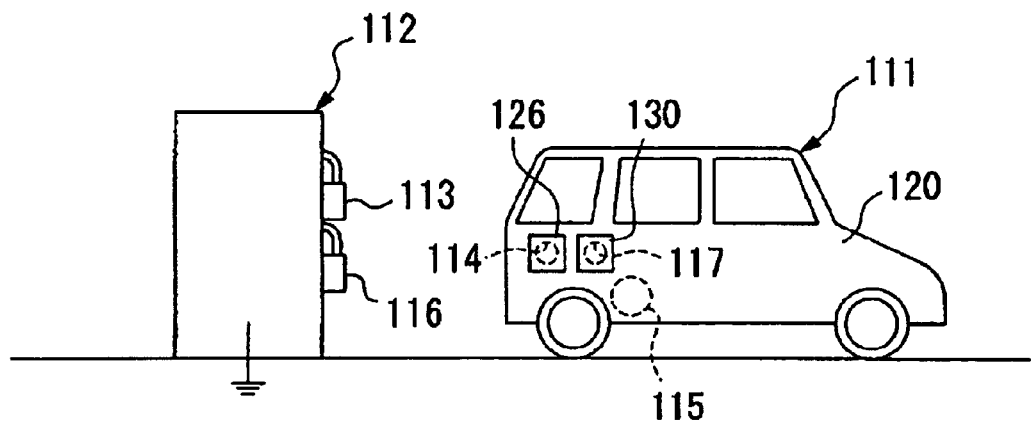
FIG. 7 is a side view showing a fuel cell powered vehicle and a fuel gas filling station in second and third embodiments of the present invention.

As shown in FIG. 7, a fuel cell vehicle 111 (a gas-fueled vehicle) includes a fuel gas filler receptacle 114 to which a fuel gas filler nozzle 113 of an external fuel gas filling station 112, which is provided separately from the fuel cell vehicle 111, is to be connected, and to which a fuel gas (e.g., hydrogen) is supplied from the fuel gas filling station 112 via the connected fuel gas filler nozzle 113, a fuel gas tank 115 which stores the fuel gas supplied from the fuel gas filling station 112 via the fuel gas filler receptacle 114, and a ground connection section 117 to which a ground connection line 116 of the fuel gas filling station 112 is connected, and which is provided for dissipating static electrical charge via the connected ground connection line 116. The fuel gas filler receptacle 114 and the ground connection section 117, which are disposed adjacent to each other, are provided at a rear and lateral portion of a vehicle body 120. In addition, a fuel filler lid 126 is provided in the vehicle body 120 where the fuel gas filler receptacle 114 is disposed, and a ground connection lid 130 is provided in the vehicle body 120 where the ground connection section 117 is disposed.

Figure 8:
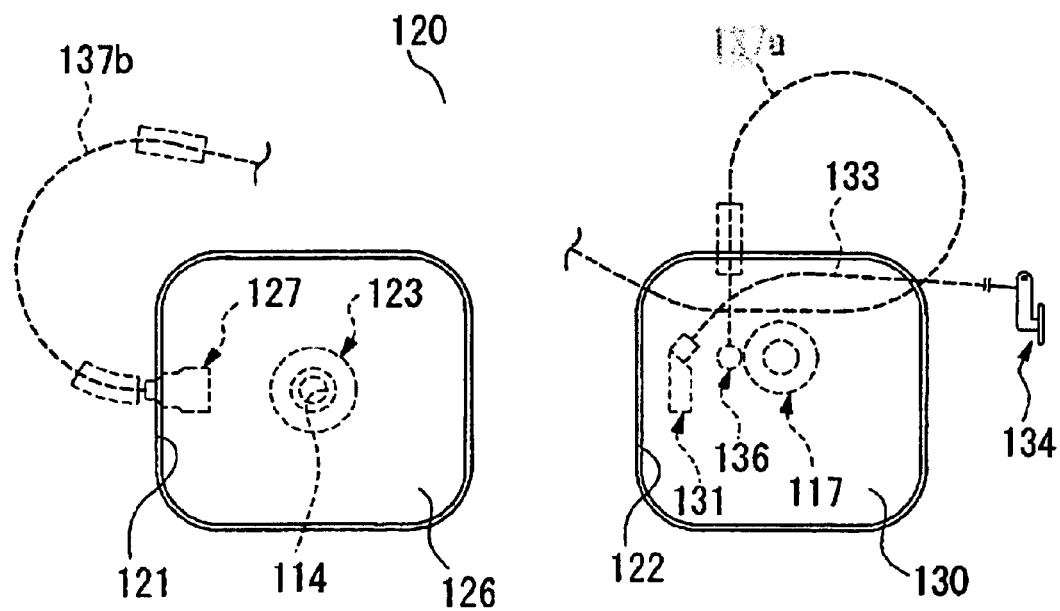
FIG. 8 is a side view showing a portion of the vehicle in the vicinity of the fuel gas filler receptacle and the ground connection section.

As shown in FIG. 8, the fuel gas filler receptacle 114 is provided in a fuel filler concave portion 121 formed in the vehicle body 120. The fuel filler concave portion 121 is provided with a fuel filler lid 126 which is swingable, by being connected to the body 120 using a hinge (not shown), between a closed state in which the fuel filler concave portion 121 is closed and an opened state in which the fuel filler concave portion 121 is opened, and is also provided with a fuel filler lid locking mechanism 127 for locking the fuel filler lid 126 in the closed state with respect to the body 120. When the fuel filler lid 126 is in the closed state, the fuel gas filler receptacle 114 is not accessible from outside because the fuel gas filler receptacle 114 is covered by the fuel filler lid 126 along with a cap 123. On the other hand, when the fuel filler lid 126 is in the opened state, the fuel gas filler receptacle 114 is exposed and is accessible from outside.

The ground connection section 117 is provided in a ground connection concave portion 122 formed in the vehicle body 120. The ground connection concave portion 122 is provided with a ground connection lid 130 which is swingable, by being connected to the vehicle body 120 using a hinge (not shown), between a closed state in which the ground connection concave portion 122 is closed and an opened state in which the ground connection concave portion 122 is opened, and is also provided with a ground connection lid locking mechanism 131 for locking the ground connection lid 130 in the closed state with respect to the vehicle body 120. When the ground connection lid 130 is in the closed state, the ground connection portion 117 is not accessible from outside because the ground connection portion 117 is covered by the ground connection lid 130. On the other hand, when the ground connection lid 130 is in the opened state, the ground connection portion 117 is exposed and is accessible from outside.

An unlocking wire 133 is connected to the ground connection lid locking mechanism 131. The unlocking wire 133 is connected to a ground connection lid opener 134 (a ground connection lid opening operation section) which is disposed in the cabin of the vehicle. When an operator (a driver) manually operates the ground connection lid opener 134, e.g., pulls the ground connection lid opener 134, in a state in which the ground connection lid locking mechanism 131 locks the ground connection lid 130 in a closed state, the ground connection lid 130 is unlocked by the movement of the unlocking wire 133, and then the ground connection lid 130 is opened. On the other hand, when the ground connection lid 130 in the opened state is swung by a filling operator so as to close the ground connection lid 130, the ground connection lid 130 is automatically locked by the ground connection lid locking mechanism 131.

Moreover, a fuel filler lid opener 136 (a fuel filler lid opening operation section), which is operated by a filling operator in order to open the fuel filler lid 126, is disposed in the ground connection concave portion 122 along with the ground connection portion 117 so as to be adjacent to each other. An operation cable 137a (an operating device) is connected to the fuel filler lid opener 136, and the operation cable 137a is connected to an operation cable 137b (an operating device) which is connected to the fuel filler lid locking mechanism 127. When an operator manually operates the fuel filler lid opener 136, e.g., pulls the fuel filler lid opener 136, in a state in which the fuel filler lid locking mechanism 127 locks the fuel filler lid 126 in a closed state, the fuel filler lid 126 is unlocked by the movement of the operation cables 137a and 137b, and then the fuel filler lid 126 is opened. On the other hand, when the fuel filler lid 126 in the opened state is swung by a filling operator so as to close the fuel filler lid 126, the fuel filler lid 126 is automatically locked by the fuel filler lid locking mechanism 127.

As explained above, the fuel filler lid opener 136, which is operated by a filling operator in order to open the fuel filler lid 126, is disposed in the ground connection concave portion 122 in the vehicle body 120 in such a manner that the fuel filler lid opener 136 is covered by the ground connection lid 130, i.e., the fuel filler lid opener 136 is not exposed, when the ground connection lid 130 is closed, and that the fuel filler lid opener 136 is exposed when the ground connection lid 130 is opened.

In addition, a fuel gas filling system is provided in the fuel cell vehicle 111, which restrains filling of the fuel gas when the shift position of the automatic transmission provided in the fuel cell vehicle 111 is in a shift position other than Park (P position), i.e., when the fuel cell vehicle 111 is not stationary, and which maintains the shift position in the parking position, i.e., maintains the fuel cell vehicle 111 in a stationary state during the filling operation of the fuel gas.

Figure 9:
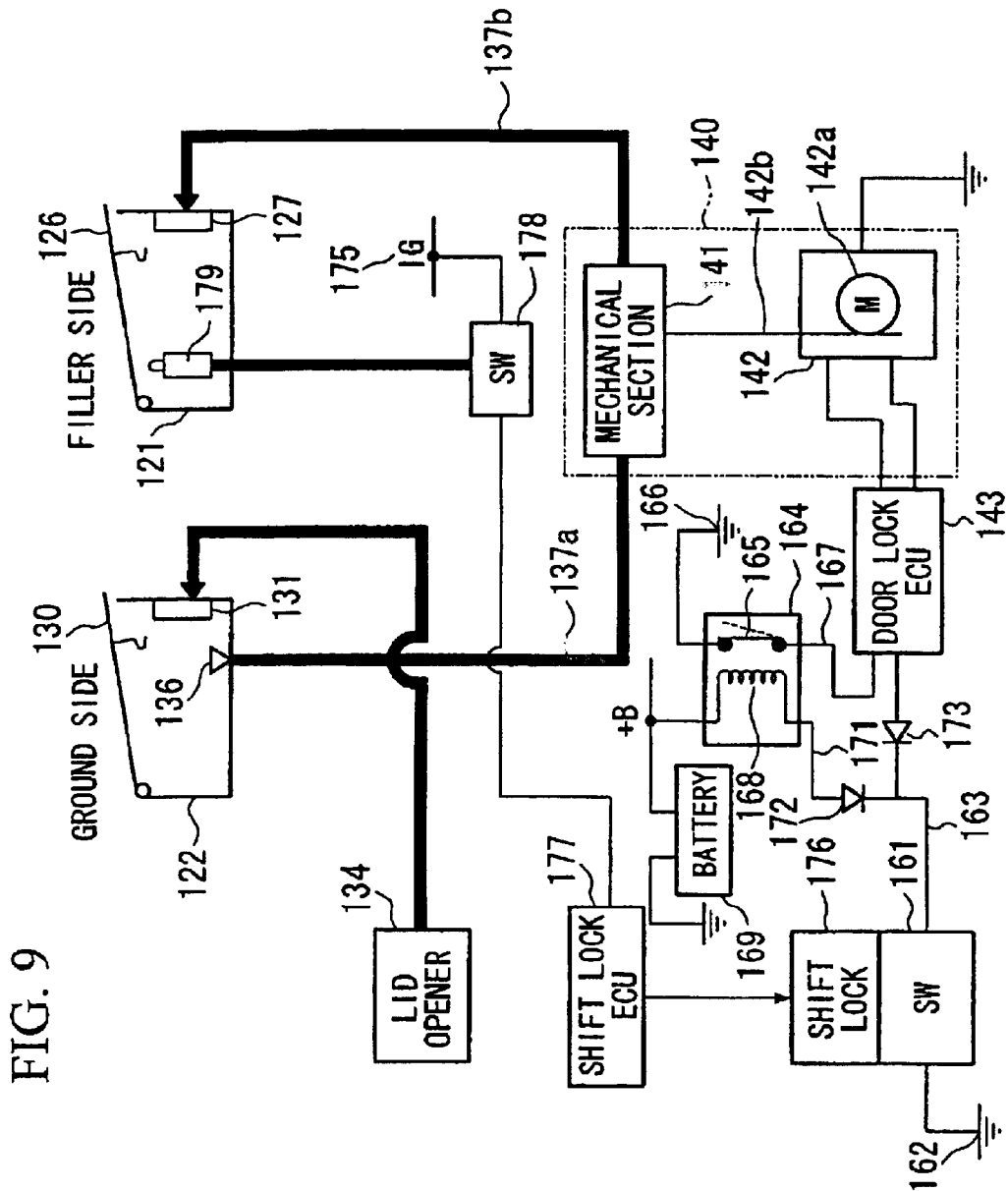
FIG. 9 is a block diagram showing a fuel gas filling system according to the second embodiment of the present invention.

As shown in FIG. 9, the fuel gas filling system includes a locking device 140 (a restraining device) which is capable of making the opening operation by the fuel filler lid opener 36 effective or ineffective, or allowable or not allowable. The locking device 140 includes a mechanical section 141 connected to the operation cables 137a and 137b, and an actuator 142 for operating the mechanical section 141. The actuator 142 includes a motor 142a and a connecting element 142b for transmitting the motion of the motor 142a to the mechanical section 141, and is made selectively operable by a door lock ECU 143.

The locking device 140 includes a movable element connected to the operation cables 137a and 137b, a fixed element for supporting the movable element in a movable manner, and a lock pin. The locking device 140 makes the opening operation by the fuel filler lid opener 136 allowable or not allowable by making the lock pin, which is operated by the actuator 142, to be inserted into or separated from the fixed element and the movable element. More specifically then the motor 142a of the actuator 142 is operated so that the lock pin, which is provided at an end of the connecting element 142b operated by the motor 142a, is inserted into the fixed element and the movable element, the opening operation applied to the fuel filler lid opener 136 is not transmitted to the operation cable 137a, i.e., the opening operation of the fuel filler lid opener 136 is not allowed.

Alternatively, a disenabling mechanism may be employed instead of the locking device 140 in order to make the opening operation of the fillet filler lid opener 136 disenabled as necessary. More specifically, the disenabling mechanism includes two operation cables, one is connected to the fuel filler lid opener 136, the other is connected to the fuel filler lid locking mechanism 127, and each of which is provided with a connecting piece having a through hole therein, and a connecting pin which is operated by a motor. When the connecting pin is inserted into the through holes formed in the connecting pieces, the operation cables are connected to each other so that the opening operation applied to the fuel filler lid opener 136 is transmitted to the fuel filler lid locking mechanism 127. On the other hand, when the connecting pin is removed from the through holes, the operation cables are disconnected from each other so that the opening operation applied to the fuel filler lid opener 136 is not transmitted to the fuel filler lid locking mechanism 127, i.e., the opening operation applied to the fuel filler lid opener 136 has no effect.

A ground connection line 163, which is connected to a ground point 162 via a shift position switch 161 that finds the current shift position in the fuel cell vehicle 111, and a ground connection line 167, which is connected to a ground point 166 via a relay switch 165 of a closing relay 164, are connected to the door lock ECU 143. The door lock ECU 143 is grounded at the ground point 162 or 166 depending on whether the shift position switch 161 and the relay switch 165 are in the ON state or in the OFF state. When the door lock ECU 143 is grounded at the ground point 162, the opening operation of the fuel filler lid opener 136 is not allowed by the locking device 140, and when the door lock ECU 143 is grounded at the ground point 166, the opening operation of the fuel filler lid opener 136 is allowed by the locking device 140.

The shift position switch 161 is in the OFF state, i.e., the contact points thereof are open, when the shift position in the fuel cell vehicle 111 is in the P position, and the shift position switch 161 is in the ON state, i.e., the contact points thereof are closed, when the shift position in the fuel cell vehicle 111 is in a position other than the P position (R, N, or D position).

A positive voltage due to a battery 169 is applied to a relay coil 168 of the closing relay 164, and a ground connection line 171 of the relay coil 168 is connected to the ground connection line 163 via a diode 172 for preventing reverse current. When the shift position switch 161 is in the OFF state, because excitation current does not flow through the relay coil 168, the relay switch 165 is placed in the ON state, i.e., the contact points thereof are closed. On the other hand, when the shift position switch 161 is in the ON state, because the relay coil 168 is excited, the relay switch 165 is placed in the OFF state, i.e., the contact points thereof are open. Another diode 173 for preventing reverse current is connected between the intersection of ground connection lines 163 and 171 and the door lock ECU 143.

Accordingly, when the shift position in the fuel cell vehicle 111 is in the P position, the door lock ECU 143 is connected to the ground point 166, and the opening operation of the fuel filler lid opener 136 is allowed by the locking device 140. On the other hand, when the shift position is in a position other than the P position, the door lock ECU 143 is connected to the ground point 162, and the opening operation of the fuel filler lid opener 136 is hot allowed by the locking device 140.

A shift lock device 176, which is operatively connected to an ignition 175 of the fuel cell vehicle 111 and is provided for fixing the shift position in the P position, is controlled by a shift lock ECU 177. The shift lock ECU 177 is connected to the ignition 175 via a fuel filler lid opening switch 178. The fuel filler lid opening switch 178 is operatively connected to an opening sensor 179 which is provided in the fuel filler concave portion 121, and which determines whether the fuel filler lid 126 is open or closed. When it is determined by the opening sensor 179 that the fuel filler lid 126 is open, the fuel filler lid opening switch 178 is placed in the OFF state, i.e., the contact points thereof are open, and when it is determined by the opening sensor 179 that the fuel filler lid 126 is closed, the fuel filler lid opening switch 178 is placed in the ON state, i.e., the contact points thereof are closed.

When the shift lock ECU 177 is disconnected from the ignition 175 by the operation of the fuel filler lid opening switch 178, the shift lock ECU 177 determines that the fuel gas is being filled, and operates the shift lock device 176 so as to fix the shift position in the P position regardless of the state of the ignition 175.

Next, the operation of this system will be explained below.

In order to supply the fuel gas to the fuel cell vehicle 111, the fuel cell vehicle 111 is completely stopped, and the shift position is placed in the P position so as to place the fuel cell vehicle 111 in a parked state. After that, when the ground connection lid opener 134 is manually operated so as to open, for example, by the driver, the ground connection lid 130, which has been locked by the ground connection lid locking mechanism 131, is unlocked by the movement of the operation cable 133, and the ground connection lid 130 is opened. Next, a filling operator connects the ground connection line 116 of the fuel gas filling station 112 to the ground connection section 117 which is exposed by opening the ground connection lid 130. At this time, the static electrical charge which has accumulated in the vehicle body 120 of the fuel cell vehicle 111 and in the filling operator is dissipated through the ground connection line 116, and as a result, potential differences among the vehicle body 120 of the fuel cell vehicle 111, the filling operator, and the fuel gas filling station 112 become zero.

Because the fuel filler lid opener 136, which is provided in the ground connection concave portion 122, is not exposed as long as the ground connection lid 130 is closed, the fuel filler lid 126 cannot be opened, and the fuel gas filler receptacle 114 will not be exposed as long as the ground connection lid 130 is closed; therefore, an erroneous operation, in which the fuel filler lid 126 is open, and the fuel gas filler nozzle 113 of the external fuel gas filling station 112 is connected to the fuel gas filler receptacle 114 before connecting the ground line 116 to the ground connection portion 117, can be avoided.

Next, when the fuel filler lid opener 136, which is exposed by opening the ground connection lid 130, is manually operated by the filling operator, the fuel filler lid 126, which has been locked by the fuel filler lid locking mechanism 127, is unlocked by the operations of the unlocking cable 137 and the mechanical section 141, and the fuel filler lid 126 is opened.

The opening operation of the fuel filler lid opener 136 is allowed by the locking device 140 so that the fuel filler lid 126 can be opened, and the fuel gas can be supplied through the fuel gas filler receptacle 114 only when the shift position is placed in the P position. On the other hand, when the shift position is placed in a position other than the P position, the opening operation of the fuel filler lid opener 136 is not allowed by the locking device 140 so that the fuel filler lid 126 is maintained to be closed, i.e., the fuel filler lid 126 is maintained to be not accessible from outside, and a filling operation of the fuel gas is reliably restrained.

Then, the filling operator removes the cap 123 of the fuel gas filler receptacle 114, which is exposed by opening the fuel filler lid 126, and connects the fuel gas filler nozzle 113 of the external fuel gas filling station 112 to the fuel gas filler receptacle 114 to supply the fuel gas to the vehicle.

When the fuel filler lid 126 is opened, the shift position is placed in the P position; therefore, an unintended movement of the fuel cell vehicle 111 from the parked location during the filling operation of the fuel gas can be reliably prevented.

When it is determined by the opening sensor 179 that the fuel filler lid 126 is open, the fuel filler lid opening switch 178 is placed in the OFF state so that the shift lock ECU 177 is disconnected from the ignition 175; therefore, the shift lock device 176 operates regardless of the state of the ignition 175. Accordingly, even when a driver tries to start the fuel cell vehicle 111 without knowing that the fuel cell vehicle 111 is in the filling operation, the shift position cannot be changed from the P position, and thus an erroneous movement of the fuel cell vehicle 111 can be reliably prevented.

After supplying the fuel gas, the filling operator removes the fuel gas filler nozzle 113 from the fuel gas filler receptacle 114, engages the cap 123 with the fuel gas filler receptacle 114, disconnects the ground connection line 116 of the fuel gas filling station 112 from the ground connection section 117, and closes the fuel filler lid 126 and ground connection lid 130. As a result, the state returns to the state before the filling operation, in which the fuel filler lid 126 is locked in the closed state by the fuel filler lid locking mechanism 127, and the ground connection lid 130 is locked in the closed state by the ground connection lid locking mechanism 131.

When it is determined by the opening sensor 179 that the fuel filler lid 126 is closed, the fuel filler lid opening switch 178 is placed in the ON state so that the shift lock ECU 177 is connected to the ignition 175; therefore, the shift lock device 176 operates in accordance with the ignition 175. When the ignition 175 is placed in the ON state in this state, the shift lock device 176 is canceled as usual, and the shift position can be changed to the D position or the like so that the fuel cell vehicle 111 can be driven.

According to the fuel gas filling system of the above embodiment, when the ground connection lid 130 is in the closed state, because the fuel filler lid opener 136 is covered by the ground connection lid 130 and is not exposed, an opening operation cannot be applied to the fuel filler lid opener 136. On the other hand, when the ground connection lid 130 is opened, both the fuel filler lid opener 136 and the ground connection section 117 are exposed so that the fuel filler lid 126 can be opened, and the ground connection line 116 of the fuel gas filling station 112 can be connected to the ground connection section 117. The connection of the fuel gas filler nozzle 113 to the fuel gas filler receptacle 114 can be accomplished only after the ground connection line 116 is connected to the ground connection section 117 by merely disposing the fuel filler lid opener 136 in a region which is covered by the ground connection lid 130 in a closed state; therefore, safety in the filling operation of the fuel gas can be ensured.

The opening operation of the fuel filler lid opener 136 is allowed by the locking device 140 only when the shift position is placed in the P position. When it is determined that the fuel filler lid 126 is open, the shift position is fixed in the P position regardless of the state of the ignition 175. Accordingly, the filling operation of the fuel gas is allowed only when the fuel cell vehicle 111 is stationary, and the fuel cell vehicle 111 can be maintained stationary during the filling operation of the fuel gas; therefore, safety in the filling operation of the fuel gas can be ensured.

In addition, during the filling operation of the fuel gas, even though the ignition 175 is placed in the ON state so as to operate the fuel cell, changing of the shift position from the P position is restrained when the fuel filler lid 126 is open; therefore, the air conditioner of the vehicle may be safely used during the filling operation, and thus comfort in the cabin can be maintained.

Figure 10:
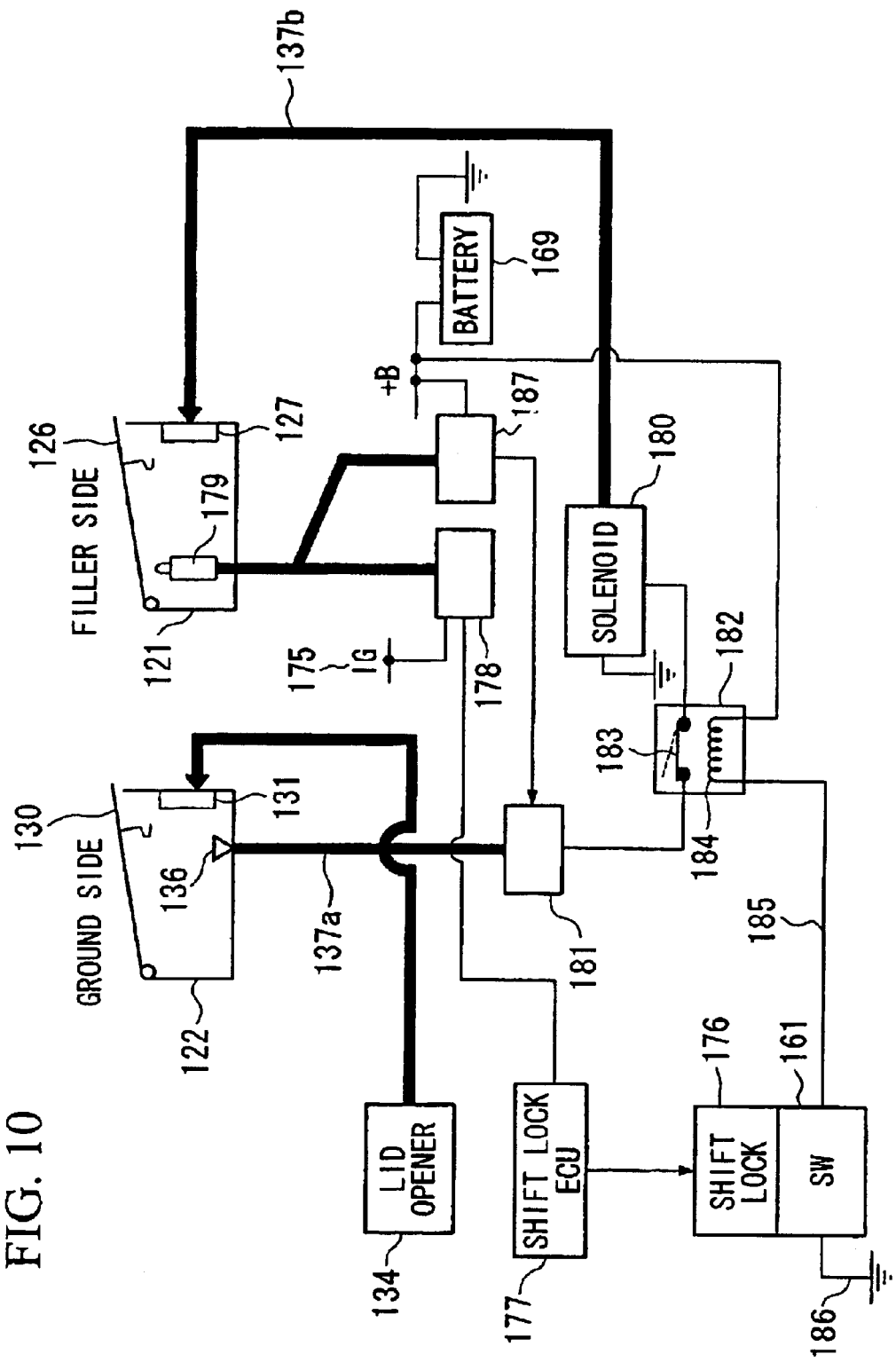
FIG. 10 is a block diagram showing a fuel gas filling system according to the third embodiment of the present invention.

Next, a third embodiment of the present invention will be explained below with reference to FIGS. 7, 8, and 10. In FIG. 10, the same reference symbols are applied to the same elements as in FIG. 9, and explanation thereof will be omitted.

The fuel gas filling system shown in FIG. 10 includes, between the operation cables 137a and 137b, a solenoid 180 (an operating device, or a coil section) which is capable of unlocking the fuel filler lid locking mechanism 127, a switch 181 (an operating device, or a switching section) for allowing electrical current to flow through the solenoid 180 in response to the opening operation applied to the fuel filler lid opener 136, and a closing relay 182 (a restraining device or a relay circuit) for allowing connection or disconnection between the switch 181 and the solenoid 180.

When an opening operation is applied to the fuel filler lid opener 136, the fuel filler lid opener 136 places the switch 181 in the ON state, i.e., closes the contact points of the switch 181, via the operation cable 137a, so that the solenoid 180 is excited, and thus unlocks the fuel filler lid locking mechanism 127 via the operation cable 137b. After completion of the opening operation, the fuel filler lid opener 136 and the fuel filler lid locking mechanism 127 respectively return to states before the opening operation was performed. More specifically, the switch 181 is placed in the OFF state, i.e., the contact points of the switch 181 are opened, and the fuel filler lid locking mechanism 127 is placed in the locking state.

The solenoid 180 is electrically connected to the switch 181 via a relay switch 183 of the closing relay 182. A positive voltage due to a battery 169 is applied to a relay coil 184 of the closing relay 182, and a ground connection line 185 of the relay coil 184 is connected to the ground connection point 186 via a shift position switch 161. When the shift position switch 161 is in the OFF state, because excitation current does not flow through the relay coil 184, the relay switch 183 is placed in the ON state, i.e., the contact points thereof are closed. On the other hand, when the shift position switch 161 is in the ON state, because the relay coil 184 is excited, the relay switch 183 is placed in the OFF state, i.e., the contact points thereof are open.

Accordingly, when the shift position in the fuel cell vehicle 111 is in the P position, the relay coil 184 of the closing relay 182 is not excited, and the relay switch 183 is placed in the ON state; therefore, when the switch 181 is placed in the ON state by the fuel filler lid opener 136, the solenoid 180 is excited. On the other hand, when the shift position is in a position other than the P position, the relay coil 184 of the closing relay 182 is excited, and the relay switch 183 is placed in the OFF state; therefore, even when the switch 181 is placed in the ON state by the fuel filler lid opener 136, the solenoid 180 is not excited.

A shift lock device 176, which is operatively connected to an ignition 175 of the fuel cell vehicle 111, is controlled by a shift lock ECU 177. The shift lock ECU 177 is connected to the ignition 175 via a fuel filler lid opening switch 178. The fuel filler lid opening switch 178 is operatively connected to an opening sensor 179. When it is determined by the opening sensor 179 that the fuel filler lid 126 is open, the fuel filler lid opening switch 178 is placed in the OFF state, i.e., the contact points thereof are open, and when it is determined by the opening sensor 179 that the fuel filler lid 126 is closed, the fuel filler lid opening switch 178 is placed in the ON state, i.e., the contact points thereof are closed.

When the shift lock ECU 177 is disconnected from the ignition 175 by the operation of the fuel filler lid opening switch the shift lock ECU 177 determines that the fuel gas is being filled, and operates the shift lock device 176 so as to fix the shift position in the P position regardless of the state of the ignition 175.

Between the switch 181 and the battery 169, there is provided a switch 187 which is operatively connected to the opening sensor 179. The switch 187 is placed in the OFF state, i.e., the contact points thereof are open, when it is determined by the opening sensor 179 that the fuel filler lid 126 is open, so that excitation current is not supplied to the solenoid 180. On the other hand, the switch 187 is placed in the ON state, i.e., the contact points thereof are closed, when it is determined by the opening sensor 179 that the fuel filler lid 126 is closed, so that excitation current is allowed to be supplied to the solenoid 180.

Next, the operation of this system will be explained below.

As in the second embodiment, in order to supply the fuel gas to the fuel cell vehicle 111, after the fuel cell vehicle 111 is placed in a parked state, the ground connection lid 130 is opened, and the ground connection line 116 of the fuel gas filling station 112 is connected to the ground connection section 117. Accordingly, an erroneous operation, in which the fuel filler lid 126 is open, and the fuel gas filler nozzle 113 of the external fuel gas filling station 112 is connected to the fuel gas filler receptacle 114 before connecting the ground line 116 to the ground connection portion 117, can be prevented.

Next, when the fuel filler lid opener 136, which is disposed in the fuel filler concave portion 121, is opened, the switch 181 is placed in the ON state by the operation of the operation cable 137a, and excitation current is supplied from the battery 169 to the solenoid 180. Because the solenoid 180 is excited, the fuel filler lid 126, which has been locked by the fuel filler lid locking mechanism 127, is unlocked by the operation of the operation cable 137b, and the fuel filler 126 is opened.

The relay switch 183 of the closing relay 182 is placed in the ON state, and excitation current is supplied to the solenoid 180 only when the shift position is placed in the P position. On the other hand, when the shift position is placed in a position other than the P position, the relay switch 183 of the closing relay 182 is placed in the OFF state, and excitation current is not supplied to the solenoid 180, so that the fuel filler lid 126 is maintained to be closed, i.e., the fuel filler lid 126 is maintained to be not accessible from outside, and a filling operation of the fuel gas is reliably restrained.

Then, the filling operator connects the fuel gas filler nozzle 113 of the external fuel gas filling station 112 to the fuel gas filler receptacle 114 to supply the fuel gas to the vehicle.

When the fuel filler lid 126 is opened, the shift position is placed in the P position; therefore, an unintended movement of the fuel cell vehicle 111 from the parked location during the filling operation of the fuel gas can be reliably prevented.

When it is determined by the opening sensor 179 that the fuel filler lid 126 is open, the shift lock device 176 operates regardless of the state of the ignition 175. Accordingly, the shift position cannot be changed from the P position, and thus an erroneous movement of the fuel cell vehicle 111 can be reliably prevented.

Moreover, when it is determined by the opening sensor 179 that the fuel filler lid 126 is open, the switch 187 is placed in the OFF state, and excitation current is not allowed to be supplied to the solenoid 180; therefore, even when the switch 181 is placed in the ON state for a long time due to, for example, a failure of the fuel filler lid opener 136, excitation current will not continuously flow through the solenoid 180, and thus waste of electrical power can be prevented.

After supplying the fuel gas, the filling operator removes the fuel gas filler nozzle 113 from the fuel gas filler receptacle 114, disconnects the ground connection line 116 of the fuel gas filling station 112 from the ground connection section 117, and closes the fuel filler lid 126 and ground connection lid 130. As a result, the state returns to the state before the filling operation.

When it is determined by the opening sensor 179 that the fuel filler lid 126 is closed, the fuel filler lid opening switch 178 is placed in the ON state so that the shift lock ECU 177 is connected to the ignition 175; therefore, the shift lock device 176 can be canceled as usual, and the fuel cell vehicle 111 can be driven.

According to the fuel gas filling system of the third embodiment, the connection of the fuel gas filler nozzle 113 to the fuel gas filler receptacle 114 can be accomplished only after the ground connection line 116 is connected to the ground connection section 117 by merely disposing the fuel filler lid opener 136 in a region which is covered by the ground connection lid 130 in a closed state; therefore, safety in the filling operation of the fuel gas can be ensured, as in the second embodiment.

The solenoid 180 can be excited so as to open the fuel filler lid 126 only when the shift position is placed in the P position. When it is determined that the fuel filler lid 126 is open, the shift position is fixed in the P position regardless of the state of the ignition 175. Accordingly, the filling operation of the fuel gas is allowed only when the fuel cell vehicle 111 is in a stationary state, and the fuel cell vehicle 111 can be maintained in the stationary state during the filling operation of the fuel gas; therefore, safety in the filling operation of the fuel gas can be ensured.

In addition, by placing the ignition 75 in the ON state so as to operate the fuel cell, the air conditioner of the vehicle may be safely used during the filling operation, and thus comfort in the cabin can be maintained.

Advantageous Effect Obtainable by the Invention

As explained above, according to the fuel gas filling system of the present invention, by appropriately operating the actuator in the locking device, the operation wire is fixed so that the opening operation applied to the opening operation section is made ineffective; therefore, opening of the fuel lid is restrained when the vehicle is not stationary. Accordingly, a reliable system for restraining opening of the fuel lid can be simply configured at low cost.

According to another fuel gas filling system of the present invention, by disposing the opening operation section for the fuel lid in a region which is covered by the ground connection lid in a closed state, a process can be simply ensured in which the connection of the fuel gas filler nozzle to the fuel gas filler receptacle can be accomplished only after the ground connection line is connected to the ground connection section. In addition, by appropriately operating the actuator in the locking device, the operation wire is fixed so that the opening operation applied to the opening operation section is made ineffective; therefore, opening of the fuel lid is restrained when the vehicle is not in a stationary state. Accordingly, a reliable system for restraining opening of the fuel lid can be simply configured at low cost.

According to another fuel gas filling system of the present invention, by disposing the fuel filler lid opening operation section in a region which is covered by the ground connection lid in a closed state, a process can be ensured in which the connection of the fuel gas filler nozzle to the fuel gas filler receptacle can be accomplished only after the ground connection line is connected to the ground connection section. In addition, by providing the restraining device on the fuel filler lid, the fuel gas can be filled only when the gas-fueled vehicle is in a stationary state; therefore, safety in the filling operation of the fuel gas can be ensured with a simple and inexpensive system.

According to another fuel gas filling system of the present invention, when the gas-fueled vehicle is not in a stationary state, opening of the fuel filler lid is mechanically restrained by the locking device, and the fuel gas can be filled only when the gas-fueled vehicle is in a stationary state; therefore, safety in the filling operation of the fuel gas can be ensured.

According to another fuel gas filling system of the present invention, when the gas-fueled vehicle is not in a stationary state, opening of the fuel filler lid is electrically restrained by the relay circuit, and the fuel gas can be filled only when the gas-fueled vehicle is in a stationary state; therefore, safety in the filling operation of the fuel gas can be ensured.

According to another fuel gas filling system of the present invention, when the fuel filler lid is open, the gas-fueled vehicle can be maintained in a stationary state; therefore, movement of the gas-fueled vehicle from the stationary location can be reliably restrained, and safety in the filling operation of the fuel gas can be ensured.

According to another fuel gas filling system of the present invention, when the fuel filler lid is open, the gas-fueled vehicle can be maintained in a stationary state; therefore, movement of the gas-fueled vehicle from the stationary location can be reliably restrained, and safety in the filling operation of the fuel gas can be ensured. In addition, electrical consumption can be maintained at a low level because continuous supply of excitation current to the coil section, which is provided for opening the fuel filler lid, is prevented.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel gas filling system for a vehicle having a supply section which allows a fuel gas filler nozzle to be connected thereto, and a fuel lid which is operable to be opened or closed for covering the supply section, the fuel gas filling system comprising:
    an opening operation section to which an opening operation for the fuel lid is applied;
    an operation wire, which is provided between the opening operation section and the fuel lid, for making the fuel lid respond to the opening operation applied to the opening operation section; and
    a locking device having a movable element connected to the operation wire, a fixed element for supporting the movable element in a manner movable with the operation wire, a lock pin for restraining movement of the movable element by being inserted into the fixed element and the movable element, and an actuator for making the lock pin to be engaged with or disengaged from the fixed element and the movable element, wherein the actuator is adapted to make the lock pin to be engaged with the fixed element and the movable element when the vehicle is not stationary.

2. A fuel gas filling system for a vehicle having a fuel gas filler receptacle which allows a fuel gas filler nozzle to be connected thereto, a fuel lid which is operable to be opened or closed for covering the fuel gas filler receptacle, a ground connection section which allows a ground connection line to be connected thereto, and a ground connection lid which is operable to be opened or closed for covering the ground connection section, the fuel gas filling system comprising:

an opening operation section which is provided in a portion that is covered by the ground connection lid in a closed state, and to which an opening operation for the fuel lid is applied;

an operation wire, which is provided between the opening operation section and the fuel lid, for making the fuel lid respond to the opening operation applied to the opening operation section; and a locking device having a movable element connected to the operation wire, a fixed element for supporting the movable element in a manner movable with the operation wire, a lock pin for restraining movement of the movable element by being inserted into the fixed element and the movable element, and an actuator for making the lock pin to be engaged with or disengaged from the fixed element and the movable element, wherein the actuator is adapted to make the lock pin to be engaged with the fixed element and the movable element when the vehicle is not in a stationary state.

3. A fuel gas filling system for a gas-fueled vehicle having a fuel gas filler receptacle which allows a fuel gas filler nozzle to be connected thereto, a fuel filler lid which is operable to be opened or closed for covering the fuel gas filler receptacle, a ground connection section which allows a ground connection line to be connected thereto, and a ground connection lid which is operable to be opened or closed for covering the ground connection section, the fuel gas filling system comprising:

a ground connection lid opening operation section to which an opening operation for the ground connection lid is applied;

a fuel filler lid opening operation section which is provided in a portion that is covered by the ground connection lid in a closed state, and to which an opening operation for the fuel filler lid is applied; and an operating device for making the fuel filler lid respond to the opening operation applied to the fuel filler lid opening operation section; and a restraining device which is adapted to permit opening of the fuel filler lid by the opening operation applied to the fuel filler lid opening operation section when the gas-fueled vehicle is in a stationary state, and to restrain opening of the fuel filler lid by the opening operation applied to the fuel filler lid opening operation section when the gas-fueled vehicle is not in a stationary state.

4. A fuel gas filling system according to claim 3, wherein the operating device comprises an operation wire provided between the fuel filler lid opening operation section and the fuel filler lid, and wherein the restraining device comprises a locking device which is adapted to make the operation of the operation wire to be possible or impossible, or to make the operation of the operation wire to be effective or ineffective.

5. A fuel gas filling system according to claim 3, wherein the operating device comprises a switching section which allows electricity to flow through when the opening operation is applied to the fuel filler lid opening operation section, and a coil section which allows the fuel filler lid to be opened by being supplied with excitation electricity when electricity flows through the switching section, and wherein the restraining device comprises a relay circuit which is adapted to make the switching section and the coil section to be connected to or disconnected from each other.

6. A fuel gas filling system according to claim 3, further comprising an opening sensor for sensing whether the fuel filler lid is open or closed, wherein the gas-fueled vehicle is maintained in a stationary state when it is determined by the opening sensor that the fuel filler lid is open.

7. A fuel gas filling system according to claim 4, further comprising an opening sensor for sensing whether the fuel filler lid is open or closed, wherein the gas-fueled vehicle is maintained in a stationary state when it is determined by the opening sensor that the fuel filler lid is open.

8. A fuel gas filling system according to claim 5, further comprising an opening sensor for sensing whether the fuel filler lid is open or closed, wherein the gas-fueled vehicle is maintained in a stationary state when it is determined by the opening sensor that the fuel filler lid is open.

9. A fuel gas filling system according to claim 5, further comprising an opening sensor for sensing whether the fuel filler lid is open or closed, wherein, when it is determined by the opening sensor that the fuel filler lid is open, the gas-fueled vehicle is maintained in a stationary state, and the excitation electricity is not supplied to the coil section.

* * * * *